United States Patent Office.

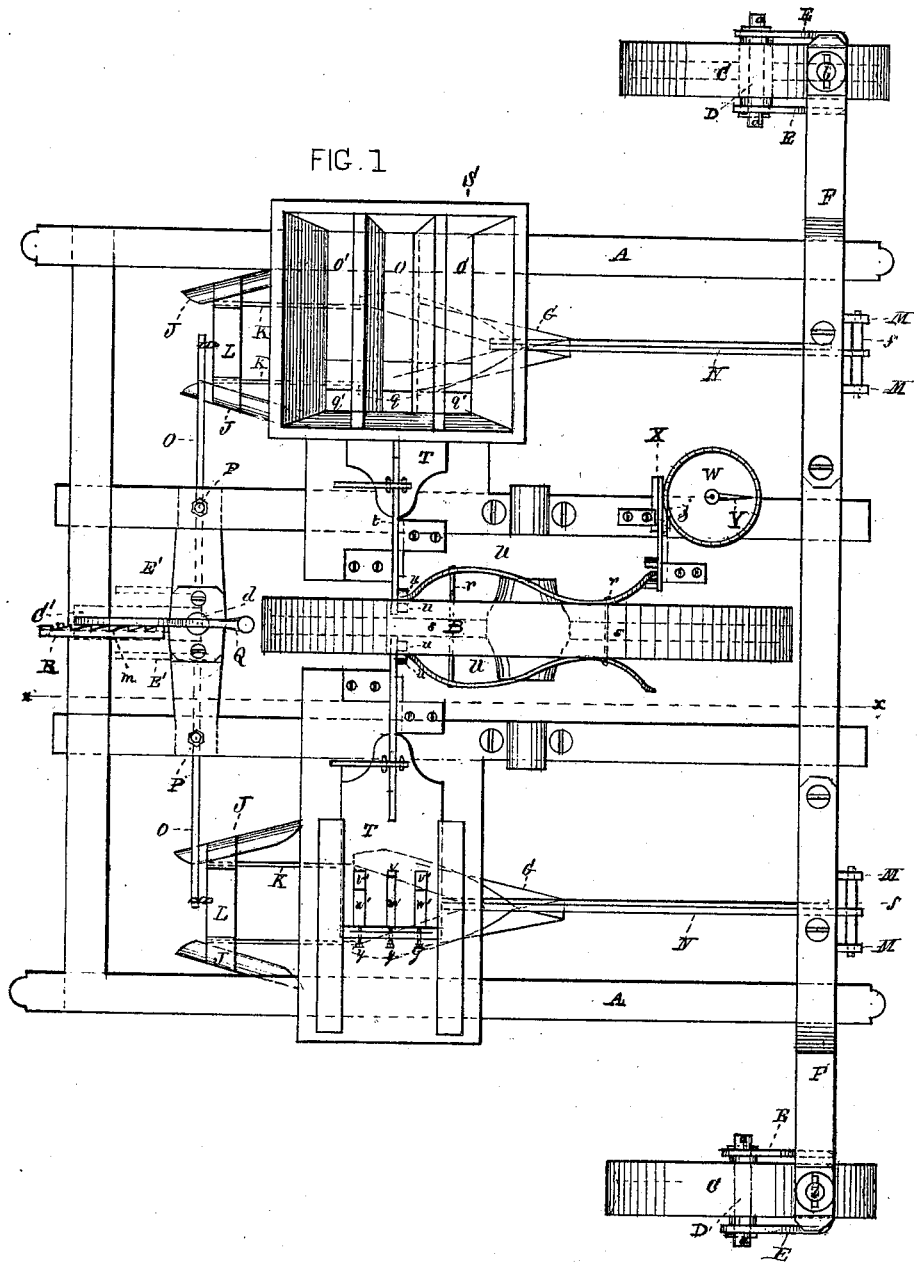

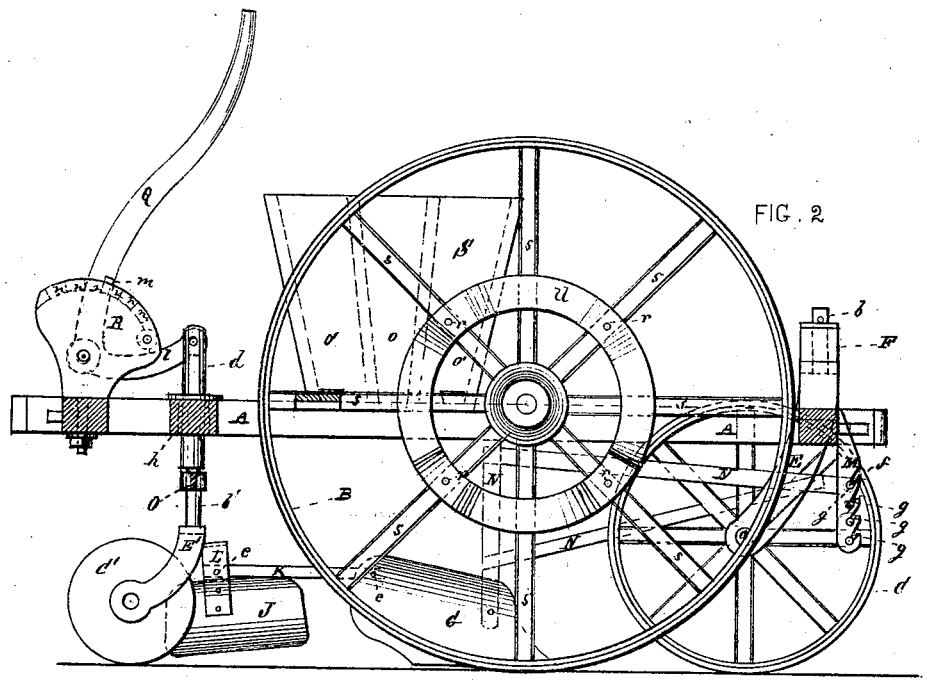

JOHN W. WOOD, OF NEW LEEDS CORNER, AND GABRIEL MOORE, OF FAIR VIEW SCHOOL HOUSE, MARYLAND.

Letters Patent No. 111,416, dated January 31, 1871.

IMPROVEMENT IN CORN AND PHOSPHATE-DRILLS.

The Schedule referred to in these Letters Patent and making part of the same.

We, JOHN W. WOOD, of New Leeds Corner, and GABRIEL MOORE, of Fair View School House, in the county of Cecil and State of Maryland, have invented certain Improvements in Corn and Phosphate-Drills, of which the following is a specification.

The nature of our invention is as follows:

The hopper or hoppers have three apartments, the middle one to contain the seed, and the side one guano or phosphate. Beneath each hopper is a slide having an opening to connect with each compartment of the hopper, each opening being provided with an adjustable slide, so that the amount of seed and phosphate to be dropped may be regulated independent of each other. The combined slides are worked by means of cams on the sides of the central traction-wheel. One of the said cams also operates a pawl which moves an indicator that is used in preparing the field for planting.

There is one plow, or more, and double mold-boards, for turning over the ground from each side of the furrows on the newly-planted seed, and the phosphate deposited in the intersection of the furrows in the forward movement of the machine. The mold-boards are situated a short distance behind the plow, and have a rigid connection therewith by means of rods or bars the ends of which are connected by means of pivots.

The height of the plow is adjusted by means of a double rack at the front of the machine with which the front end of their draft-bars are connected. The height of the mold-boards is adjusted by means of a lever which is connected with the stem of a caster-wheel yoke at the rear end of the frame of the machine, the lever being combined with a stationary ratchet in such a manner as to be confined in its adjusted position. Both the plow and mold-boards are elevated above the ground and held by the same device in their elevated position when not desired to operate. The rear end of the machine is elevated by the same movement, whereby the traction-wheels are elevated above the ground and the motion of the feed-slides arrested. The motion of the said slide is also arrested when the machine is running on common roads, without the elevation of the traction-wheels, by an unshipping arrangement of the slides, as hereinafter described.

To enable others skilled in the art to which our improvement appertains to make and use our machine, we will now give a detailed description thereof.

In the accompanying drawing which makes a part of this specification—

Figure 1 is a plan of the machine with one of the hoppers S removed therefrom.

Figure 2, sheet No. 2, is a longitudinal section at the line $x\ x$ of fig. 1.

Figure 3 is a perspective view of one of the hoppers S in an inverted position, for showing the construction of its bottom $p$.

Figure 4 is an isometrical view of one of the combined slides $u$ on an enlarged scale.

Figures 5 and 6 are a top and side views of one of the slide-rods $t$.

Figures 7 and 8 are like views of the slide X and pawl $z$ in connection.

Figures 9 and 10 are top and side views of the double levers O O.

Like letters in all the figures indicate the same parts.

A is a horizontal frame, to which the other parts of the machine are attached;

B is a central traction-wheel;

C C are front caster-wheels; and

C', a rear caster-wheel, which assists in supporting the weight of the machine.

The journals $a$ of the shafts D D have their bearings in the yokes E E, whose central stems $b\ b$ have a free turn in the outer ends of the irons F F. The said irons are bolted to the upper side of the frame A. The stem $b'$ of the yoke E' of the rear caster-wheel C' turns freely in a socket in the lower end of the vertical shaft $d$, the said shaft having a movement in the bushing $h'$, as hereinafter described.

G G are plows at each side of the frame A. Right and left mold-boards J J are connected with each plow, in the rear of the same, by means of the straps or rods K K, yoke L, and pivots $e$. The front part of the plow is connected to the stationary double rack M attached to the front of the frame A, as seen in figs. 1 and 2, by means of the draft-irons N, the joint end of which is provided with the cross-rod $f$, whose ends are caused to rest in slots $g$ of the rack, to hold the plow in its adjusted position.

The mold-boards at each side of the machine are hung to the outer ends of the horizontal levers O O, which have fulcrum-pins $h$ confined to the hangers P P that project from the lower side of the frame A, the levers having slots $i$, which connect with the said fulcrum-pins to allow an easy movement. The inner ends of the levers are jointed to the vertical socket $j$, situated on the stem $b'$ of the caster-wheel C'.

Q is a lever, whose fulcrum $k$ projects from one side of the stationary ratchet R. The arm $l$ of the lever is jointed to the shaft $d$, in connection with the upper end of the stem $b'$ of the yoke E' of the caster-wheel C'. The lever is provided with a tooth, $m$, which connects with a tooth, $n$, of the ratchet R when the lever is brought into the proper position to adjust the height of the wheel C', and thus to regulate the height of the mold-boards J. By the same device in the forward movement of the lever the rear part of the machine is sufficiently elevated to bring the mold-boards and plows above the ground when not required to operate.

S S are the hoppers, which supply the seed and phosphate to the hills. They are divided into compartments o o' o', the former containing the seed and the two latter the phosphate. In the bottoms p of the hoppers there is an opening, q, into the middle compartment o, and openings q' q' into the compartments o' o'.

In combination with the hoppers S S are horizontal slides T T, which are operated by means of the series of cams on the rings U U, which are confined by the rods r to the spokes s of the traction-wheel B, as seen in fig. 2.

The rods t t of the slides have friction-wheels u u at their inner ends, which connect with the cams, as seen in fig. 1. The said slides have openings v v' v', which correspond with the openings q q' q' of the bottoms p of the hoppers S S, to admit of the passage of the seed and phosphate to the hills when the former are brought into connection with the latter by the action of the cams.

The openings v v' v' in the slides T T are provided with slides w w' w', which are adjustable by means of the set-screws y, as seen in fig. 4, whereby the quantity of seed and phosphate fed through the slides is each regulated independent of the other.

W is a revolving indicator, which is operated by means of one of the cam-rings U above-described, acting through the pawl z, which is hung to the slide X. Each forward movement of the slide causes the pawl to carry the indicator around two teeth past the pointer Y, and there being thirty-two teeth, sixteen hills are dropped in each furrow at one revolution of the indicator, there being a corresponding action between the slide X and the feeding-slides T T. For the purpose of throwing the slides T T out of gear with the cam-rings U U when the machine is running on the road, the rods t t have cross-slots 1 1, with which the levers Z Z connect when the slides are in gear. When the slides are to be disconnected, the levers are thrown out of connection with said grooves, allowing the rods to vibrate backward and forward in the slots 2 2, which are prolonged into the slides far enough to allow of free play for the rods without moving the slides.

What we claim as our invention, and desire to secure by Letters Patent, is—

1. The construction of the hoppers S with triplicate compartments o o' o' for distributing the seed and phosphate at one operation, in combination with the slides T, constructed, arranged, and operating substantially in the manner and for the purpose above described.

2. The combination and arrangement of the double mold-boards J J with the plows G by means of the straps or rods K, yokes L, and pivots e, substantially as and for the purpose set forth.

3. In combination with the mold-boards J the lever Q, ratchet R, double-jointed levers O O, socket j, and stem b' of the yoke E, the several parts being constructed and arranged for joint action, substantially in the manner and for the purpose specified.

4. The combination and arrangement of the slide X and pawl z with the cam-ring U and indicator W, substantially as and for the purpose set forth.

5. The combination and arrangement of the levers Z with the rods t of the slides T by means of the slots 1 2, substantially in the manner described, and for the purpose specified.

In testimony that the above is our invention we we have hereunto set our hands and affixed our seals this 12th day of November, 1870.

JOHN W. WOOD. [L. S.]
GABRIEL MOORE. [L. S.]

Witnesses:
GEORGE F. HARLAN,
JOHN H. HARLAN.